(12) United States Patent
Hoskins

(10) Patent No.: US 11,585,167 B2
(45) Date of Patent: Feb. 21, 2023

(54) APPARATUS AND METHOD FOR BEAD RECOVERY

(71) Applicant: SOLID FLUIDS & TECHNOLOGIES CORP., Calgary (CA)

(72) Inventor: Terry W. Hoskins, Calgary (CA)

(73) Assignee: SOLID FLUIDS & TECHNOLOGIES CORP., Calgary (CA)

( * ) Notice: Subject to any disclaimer, the term of this patent is extended or adjusted under 35 U.S.C. 154(b) by 352 days.

(21) Appl. No.: 16/795,452

(22) Filed: Feb. 19, 2020

(65) Prior Publication Data

US 2020/0263512 A1 Aug. 20, 2020

Related U.S. Application Data

(60) Provisional application No. 62/807,533, filed on Feb. 19, 2019.

(51) Int. Cl.
*E21B 21/06* (2006.01)
*B07B 1/46* (2006.01)

(52) U.S. Cl.
CPC .......... *E21B 21/065* (2013.01); *B07B 1/4609* (2013.01); *B07B 2201/04* (2013.01)

(58) Field of Classification Search
CPC .. E21B 21/065; B07B 1/4609; B07B 2201/04
(Continued)

(56) References Cited

U.S. PATENT DOCUMENTS

| 4,250,974 A | * | 2/1981 | Heilhecker | ............. E21B 21/08 |
| | | | | 175/206 |
| 6,138,834 A | * | 10/2000 | Southall | ................ E21B 21/065 |
| | | | | 209/314 |

(Continued)

FOREIGN PATENT DOCUMENTS

| CA | 2266309 C | 7/2000 |
| CA | 2457567 C | 8/2004 |

(Continued)

*Primary Examiner* — Terrell H Matthews
(74) *Attorney, Agent, or Firm* — Bennett Jones LLP

(57) ABSTRACT

An apparatus and method for facilitating recovery of lubrication beads is provided. The apparatus includes a hydrocyclone, for separating drilling fluid into a high density stream and a low density stream containing a major portion of the lubrication beads; a receiving pump, for pumping drilling fluid to the hydrocyclone; a discharge pump, for pumping the high density stream from the lower end of the hydrocyclone to further processing; and a hose for flowing the low density stream from the upper end of the hydrocyclone to the cleaned fluid handling system. A method for integrating the apparatus for facilitating recovery of lubrication beads from a drilling fluid into a solids control apparatus includes positioning an end of a first hose to receive the drilling fluid; arranging an end of a second hose in communication with the first shaker's filter screen; and setting an end of a third hose to empty into the cleaned fluid handling system. A method for facilitating recovery of lubrication beads from a drilling fluid by a shaker system includes receiving drilling fluid in a hydrocyclone; separating the drilling fluid into a high density stream and a low density stream containing a major portion of the lubrication beads; and flowing the high density stream to a first shaker of the shaker system, and directing the low density stream to a second shaker of the shaker system.

7 Claims, 3 Drawing Sheets

(58) Field of Classification Search
USPC .......................................................... 175/206
See application file for complete search history.

(56) References Cited

U.S. PATENT DOCUMENTS

| | | | |
|---|---|---|---|
| RE38,367 E | 12/2003 | Southall | |
| 6,892,887 B2* | 5/2005 | Rayborn | B07B 1/4672 |
| | | | 209/173 |
| 7,823,656 B1* | 11/2010 | Williams | E21B 21/01 |
| | | | 175/38 |
| 2004/0154963 A1* | 8/2004 | Rayborn | B03B 9/00 |
| | | | 209/331 |

FOREIGN PATENT DOCUMENTS

| | | | | |
|---|---|---|---|---|
| CA | 2891177 A1 | 11/2016 | | |
| WO | WO-2005014969 A1 * | 2/2005 | | E21B 21/001 |
| WO | WO-2016179686 A1 * | 11/2016 | | |

* cited by examiner

APPARATUS AND METHOD FOR BEAD RECOVERY

BENEFIT OF EARLIER APPLICATIONS

This application claims priority from U.S. provisional application 62/807,533, filed Feb. 19, 2019.

TECHNICAL FIELD

The present invention relates generally to mechanical material separation and, in particular, to solid lubrication bead separation in particular.

BACKGROUND

In the resource extraction industry, solid or semi-solid lubrication beads are used to lubricate drilling operations. It is desirable to recover used beads so that they may be used again. This is done using shakers to receive a slurry including beads and drill cuttings, and then shake or vibrate the slurry over a mesh screen, allowing fine material to fall through the mesh and thereby separating the beads and other large solids, which are left on top of the mesh. Shakers may be arranged in series for larger operations.

SUMMARY OF INVENTION

In accordance with a broad aspect of the present invention, there is provided an apparatus for facilitating recovery of lubrication beads from a drilling fluid by a solids control apparatus, the solids control apparatus including a first shaker and a cleaned fluid handling system; the apparatus comprising: a hydrocyclone, with an upper end and a lower end, for separating drilling fluid into a high density stream and a low density stream containing a major portion of the lubrication beads; a receiving pump, for pumping drilling fluid to the hydrocyclone via a first hose; a discharge pump, for pumping the high density stream from the lower end of the hydrocyclone to the first shaker via a second hose; and a third hose, for flowing the low density stream from the upper end of the hydrocyclone to the cleaned fluid handling system.

In accordance with another broad aspect of the present invention, there is provided a method for integrating an apparatus for facilitating recovery of lubrication beads from a drilling fluid into a solids control apparatus including a first shaker and a cleaned fluid handling system; the apparatus including a hydrocyclone, with an upper end and a lower end, for separating drilling fluid into a high density stream and a low density stream containing a major portion of the lubrication beads; a receiving pump, for pumping drilling fluid to the hydrocyclone via a first hose; and a discharge pump, for pumping the high density stream from the lower end of the hydrocyclone to the first shaker via a second hose; and a third hose for flowing the low density stream from the upper end of the hydrocyclone to the cleaned fluid handling system; the method comprising: positioning an end of the first hose to receive the drilling fluid; arranging an end of the second hose in communication with the first shaker's filter screen; and setting an end of the third hose to empty into the cleaned fluid handling system.

In accordance with yet another broad aspect of the present invention, there is provided A method for facilitating recovery of lubrication beads from a drilling fluid by a shaker system, the method comprising first, receiving drilling fluid in a hydrocyclone; second, separating, by the hydrocyclone, the drilling fluid into a high density stream and a low density stream containing a major portion of the lubrication beads; and third, flowing the high density stream to a first shaker of the shaker system, and directing the low density stream to a second shaker of the shaker system.

In accordance with yet another broad aspect of the present invention, there is provided an automated mechanical recovery system and method to separate and recover friction reducing lubrication beads, spheres, or particulate from an existing homogenized circulating fluid or an actively circulating homogenized fluid with a processing method starting at an isolated point prior to the circulating fluid, or fluids, being conditioned by mechanical solids control equipment intended to remove waste solids from the fluids; then returning the recovered lubrication beads back to the active circulation fluid flow loop at a point before the circulating fluid, that has now been conditioned by solids control equipment is pumped back down a hole or well bore and is now ready to have the captured lubrication beads re-introduced to the fluid, for reuse, to provide lubrication in the down hole or well environment pumping circulation loop.

In accordance with yet another broad aspect of the present invention, there is provided an automated mechanical recovery system and method to separate and recover low density lubrication beads, spheres, or particulate for reintroduction, reuse, or return into a circulating fluid, in the original active system closed flow loop as an extension of the loop, at a point in the flow loop where the homogenized fluid returns to surface but before the circulating fluid has been conditioned with mechanical solids control equipment to remove undesirable solids comprised of drilled solids or other solids.

In accordance with yet another broad aspect of the present invention, there is provided an automated mechanical recovery system and method to separate and recover friction reducing lubrication beads, spheres, or particulate from an existing homogenized circulating fluid or an actively circulating homogenized fluid with a processing method starting at an isolated point prior to the circulating fluid, or fluids, being conditioned by mechanical solids control equipment intended to remove waste solids from the fluids; then returning the solids slurry back to the active circulation fluid flow loop at a point just after the isolated main suction point, such that solids slurry can be conditioned and separated by shakers or by solids control equipment, for disposal, and the cleaned fluid can return into the circulation loop.

In accordance with yet another broad aspect of the present invention, there is provided a method of separating and recovering friction reducing lubricating beads from a an already homogenized actively circulating down hole fluid or well fluid for reuse in the same fluid.

In accordance with yet another broad aspect of the present invention, there is provided a ethod of separating and recovering friction reducing lubricating beads from a homogenized circulating fluid or drilling fluid at an isolated point where the fluid is returned to surface before entering the solids control equipment of the circulation loop.

In accordance with yet another broad aspect of the present invention, there is provided a method of recovering friction reducing lubricating beads from a homogenized actively circulating fluid or drilling fluid being returned to surface at a flowline, before any solids control equipment processing point in the flow loop, then re-introducing the recovered beads to the circulating fluid, for reuse, after solids control equipment and prior to the circulating fluid being pumped back down a hole or well bore to provide lubrication in the homogenized fluid, or fluids, being pumped down hole or well bore in the flow loop.

In accordance with yet another broad aspect of the present invention, there is provided a mechanical lubrication bead recovery system that is controlled with ultrasonic fluid level measuring and computer programmed interface; where the pumps of the system are regulated on/off, or by variable speeds by the interface based on the readings provided from the ultrasonic fluid level indicators of the recovery system at the point of their installation; defined as the initial isolated suction point of the recovery system where an actively circulated fluid is returned and intercepted by the invention as an extension of the active circulation loop at surface prior to solids control measures.

In accordance with yet another broad aspect of the present invention, there is provided a mechanical lubrication bead recovery system that is controlled with automatic ultrasonic level probes; at the point of the recovery systems hydrocyclone underflow catch bin; where the fluid having been processed to separate a plurality of the lubrication beads through a hydrocyclone process which discharges an underflow of primarily solids, with some fluid, is captured in a solids catch bin on the recovery system and pumped back to a point in the flow loop at, just after the isolated suction point, and at the start point of primary solids control equipment for processing, a point being located just after the isolated point where the bead recovery systems initial point of suction occurs.

In accordance with yet another broad aspect of the present invention, there is provided a mechanical pumping and recovery system that is controlled with automated ultrasonic fluid level probes and a programmed control interface to control and regulate the bead recovery systems on/off operations, in timing with the on/off pumping operations of the actively circulated original fluid flow loop pressure pumping operations and the required pumping equipment.

It is to be understood that other aspects of the present invention will become readily apparent to those skilled in the art from the following detailed description, wherein various embodiments of the invention are shown and described by way of illustration. As will be realized, the invention is capable of other and different embodiments and its several details are capable of modification in various other respects, all within the present invention. Furthermore, the various embodiments described may be combined, mutatis mutandis, with other embodiments described herein. Accordingly, the drawings and detailed description are to be regarded as illustrative in nature and not as restrictive.

BRIEF DESCRIPTION OF THE DRAWINGS

Referring to the drawings, several aspects of the present invention are illustrated by way of example, and not by way of limitation, in detail in the figures, wherein.

DETAILED DESCRIPTION OF EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

The present apparatus and method facilitate recovery of lubrication beads using existing shaker systems. In one embodiment, a hydrocyclone receives drilling fluid, including lubrication beads, and separates the drilling fluid into a light, low density stream at the hydrocyclone's upper end, and a heavier, high density stream at the hydrocyclone's lower end. Each of the streams is sent to a different shaker for further processing. The high density stream is directed to a first shaker, and the low density stream is directed to a second shaker.

Figure 1:
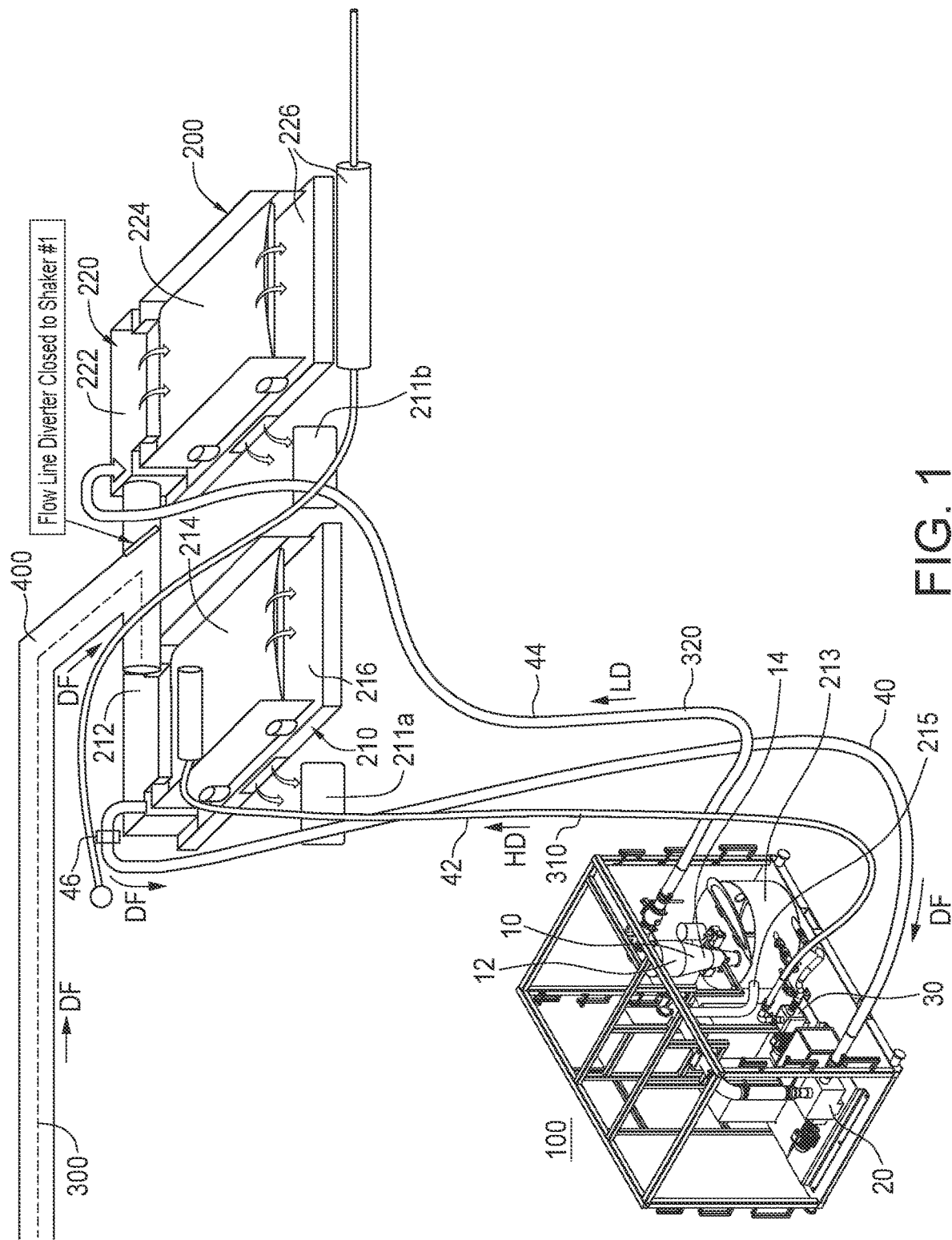
FIG. 1 is a schematic view of an apparatus according to one embodiment of the present invention in communication with a system of shakers.
Figure 2:
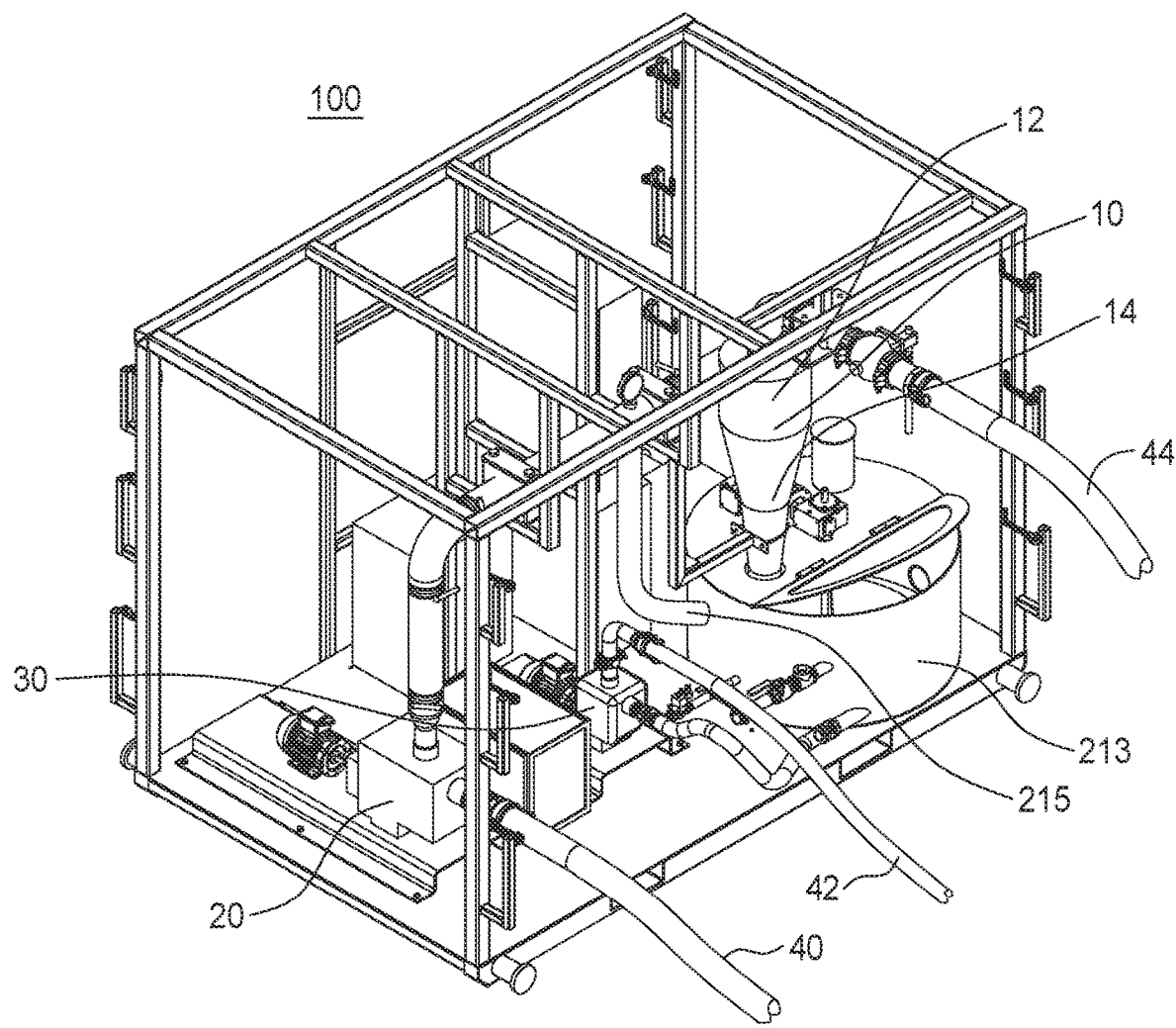
FIG. 2 is a front perspective view of the apparatus of FIG. 1; and (c)
Figure 3:
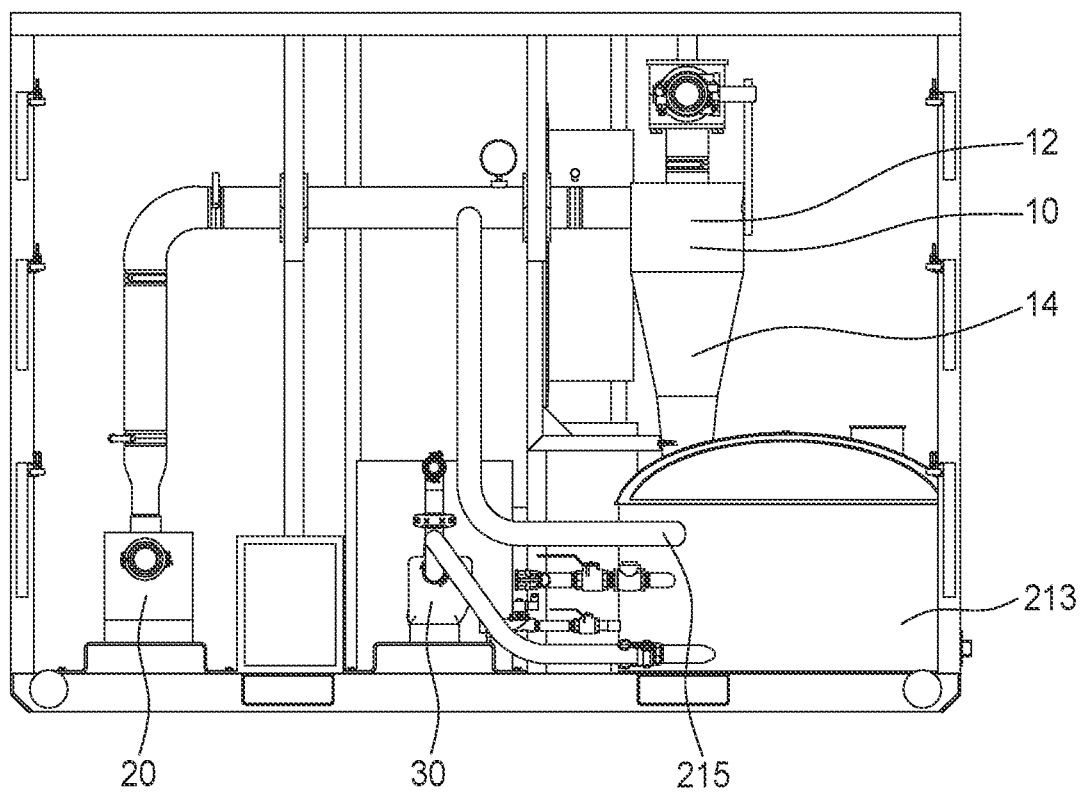
FIG. 3 is a front elevation view of the apparatus of FIG. 1.

With reference to the figures, in particular FIG. 1, an apparatus 100 includes a hydrocyclone 10 and a receiving pump 20. The receiving pump flows a drilling fluid 300, arrows DF, from a source coming from the well and upstream of solids control equipment such as shaker screens, which may from a well returns flow line 400 or, as shown, from an intake tank 212 of a first shaker 210, to the hydrocyclone 10 via a first hose 40.

The hydrocyclone has an upper end 12 and a lower end 14. The hydrocyclone then separates the drilling fluid into a high density stream 310 at its lower end 14 and a low density stream 320 at its upper end 12. The low density stream will have a major portion of the lubrication beads that were present in the drilling fluid before entering the hydrocyclone.

The high density stream from the hydrocyclone is directed, arrow HD, to the first shaker 210 via a second hose 42. If the feed for the hydrocyclone is taken from intake tank 212 of the first shaker, then the high density stream is discharged onto screen 214 of the first shaker, so that the separated high density stream is not mixed with the unprocessed hydrocyclone feed.

A third hose 44 directs the low density stream 320, arrow LD, to a cleaned fluid handling system 200. Cleaned fluid handling system 200 may include a second shaker 220 or other fine solids control apparatus such as centrifuges or settling tanks, or may be a line back to the drilling fluid preparation apparatus. In one embodiment, the low density stream is directed to second shaker 220, for example to its intake tank 222 or onto its screen 224, for further processing.

One or more pumps, such as discharge pump 30, can be used to drive flow of the streams. In one embodiment, discharge pump 30 acts on the high density stream in hose 42.

Because the first shaker receives the high density stream and the second shaker receives the low density stream, in one embodiment, screens 214, 224 may be selected such that screen 214 has a mesh density less than that of screen 224.

In one embodiment, a valve, such as a solenoid valve 46, may be connected to the first hose. This valve can be used to turn off flow to the hydrocyclone. A solenoid valve is particularly useful because its default position is open. If, for example, apparatus 100 were to lose power, the solenoid valve would open, thereby preventing syphoning through the first hose. In other words, with a solenoid valve present, fluid can only flow to the hydrocyclone if the apparatus has power. The solenoid valve may be controlled to respond to other conditions as well, such as emergency conditions or shut down procedures.

The apparatus may be connected to an existing shaker system at a wellsite. In one embodiment, an end of the first hose 40 may be positioned to receive drilling fluid. For example, it may be positioned in intake tank 212, or may be connected to a flow line 400. The second hose may be arranged in communication with the first shaker's filter screen. For example, second hose 42 may have an end positioned to empty onto filter screen 214. The third hose may be arranged such that one of its ends empties into the second shaker 220, for example into intake tank 222 or screen 224.

For a more detailed understanding, the present invention relates generally to a mechanical recovery system and process method that separates desirable solid or semi-solid polymer lubrication beads from a drilling or circulating fluid prior to shakers, including any other mechanical solids control equipment that is intended to remove mixtures of solids, drilled solids, including desirable and or undesirable solids from a drilling or circulating fluid in an as dry as possible form. Solids control measures include; linear motion vibrating screen shakers, solids separation shakers equipped with sized vibrating mesh screens, and or decanting centrifuges, high gravity centrifuges, at a well site or drilling site intended to remove both sometimes desirable and undesirable solids from a fluid system in an as dry or solid form as possible for disposal; in an effort to maintain the desirable properties of the circulating fluid or fluids. Such solids control measures may be substituted for one another. The present invention separates for re-use the desirable low-density polymer lubrication beads added to an actively circulated homogenized fluid system prior to other solids control equipment that would expel the lubrication beads, for the beads return and re-use in a fluid system as a solid or semi-solid lubricant. Solid or semi-solid polymer beads are desirable in a fluid to provide a mechanical ball bearing effect and or friction reduction via surface pebbling, to reduce surface friction forces between contact points of steel on steel, between steel and rock, in down hole or open hole drilling, well servicing operations, and or to reduce cased hole and open hole well bore drill pipe, tubing, or production liner surface area contact points, friction, torque forces, and or total drag forces while rotating, reciprocating, running strings into the hole or well bore, and or pulling upon the continuous string of drill pipe, tubing, liner, and casing strings in or out of the ground or a well. Current lubrication bead recovery processes utilize equipment intended to recover the desirable lubrication beads from the resultant solids mixture while drilling, combined solids, mixtures of desirable and undesirable solid materials, having been already separated by solids control equipment and or additional solids control equipment processing the circulating drilling fluid, fluids, to produce as dry as possible solids for disposal. Current bead recovery processes are positioned after solids control measures and require the then dried, partially dried, solids mixture to be re-homogenized in a fluid and re-processed to separate the lubricant beads. The present invention does not require additional solids re-homogenization tanks, and or additional screened shakers to process the separation and recovery of the desirable lubrication beads from an actively circulated homogenized fluid and does not process the removed waste solids, dry solids, and or solid mixtures to recover the lubricant beads for re-use in the fluid. The present invention and process to remove and recover solid or semi-solid polymer lubricating compounds in the form of generally spherical beads, to oval particles of low specific gravity, as low-density polymer beads or spheres, such as Sun Products Drilling Beads® made of sized polystyrene spheres as referred to in Patent # U.S. Pat. No. RE38,367 E. The present invention and process to remove and recover solid or semi-solid polymer lubricating compounds directly from an actively circulating fluid and or drilling fluid with the fluid and fluid components in an already homogenized state as the result of the circulation down hole for drilling purposes, for the continual re-use of the recovered bead lubricant in the circulating fluid system; prior to the homogenized drilling fluids, fluids, entry into the installed solids control measures and equipment intended to clean the fluid and remove undesirable solids, or solids in general. The present invention can be utilized in all types of drilling and workover applications including both onshore or land operations, offshore operations, as a small skid package, permanent package, or be directly piped into the equipment of an original or existing circulation system as described above.

In the process of drilling a well into an oil and or gas bearing formation, a drilling fluid or "mud" is pumped into the developing well bore through a continuous string of drill pipe or tubing and exits through the end of the pipe via orifices or nozzles in a drill bit or tools mounted at the end of the drill pipe and or tubing. Drilling fluids perform several functions essential to the drilling of oil or gas wells, one of the primary functions that drilling fluids perform is to bring back to surface the drilled rock or cuttings from the new developing hole or open hole surfaces where they can be separated from the drilling fluid by solids control equipment to preserve the desirable characteristics of the drilling fluid. A secondary function is to provide lubrication of the drilling string, tubing, or liner while the pipe is moving in any direction between the contacting surfaces, and resultant frictional forces, of steel on steel, steel on rock, and combinations thereof. Many kinds of lubricants are added to the drilling fluid or fluids however lubricants fall generally into two categories; mechanical or solid lubricants and liquid based lubricants.

A drilling fluid may be aqueous based, hydrocarbon based, synthetic based, fresh or brackish water, chemically inhibited to reduce clay swelling and or reduce open hole drilling problems, may contain various salts to provide inhibition of solids, prevent the hydration of shale or clay formations, or increase the fluid density or specific gravity, and or an emulsion of the above fluids or parts of the above fluids. In some cases, even gases can be used such as in air drilling or when nitrogen gases, or other gases, are used to lower the density of a base fluid or to create partial aeration, foam, or partial foam and or aeration of the base fluid.

Increased lubrication of the drill pipe, tubing, coiled tubing, liner, and or casing is desirable to operators to create more efficient drilling and completion operations and currently is an expensive problem facing the drilling industry today. With the increase in horizontal drilling and multistage fracturing of production zones, the added expense of this type of drilling and well completions, means the rate of penetration (ROP), and lateral length or total measured depth (TMD) of extended reach drilling operations can greatly affect the cost effectiveness and overall economics of the drilling and production operations. Torque and drag forces upon the drill pipe, tubing, coiled tubing, casing, and production liner placements (runs) can greatly limit the overall length of drilling, working over, or completing wells with extended TMD's. The time and costs required to drill longer lateral lengths is increased as rates of penetration (ROP) slow down. The ability to push pipe strings into the ground can be limited from friction forces by not allowing enough weight translation or push from the combined weight of the vertical drill pipe being transferred to the lateral drill pipe and reach the drill bit, providing force to drill bit cutters and cutting pressure to the rock face to develop new hole. The same frictional forces can produce pipe buckling forces being detrimental to the drilling operation. It is therefore desirable to improve methods for reducing the torque and drag forces occurring in the well including inside steel casing sections, open hole exposed formations, or combinations of both at high friction contact points, extended surface area contact points, from the contacted underground formations upon the drilling assembly, drill pipe, tubing, coiled tubing, liners and steel casing that can increase the ROP and extend the length of TMD's reachable in a given size of new hole for both drilling operations and running casing or liners.

Lubricants added to fluids can either be liquid based; which are designed to be an internal part or percentage of the circulating fluid with generally an affinity to attach themselves to metal or rock surfaces to potentially create a friction barrier; or may be generally mechanical such as solid, or semi-solid lubricants which can be added to a fluid in an attempt to reduce the coefficient of friction at contact points, pebble a surface, or provide a roller bearing type lubrication effect similar to ball bearings in the form of glass or polymer beads. Providing lubrication with spherical materials is an attempt to pebble the well bore, limiting surface area contact points, smooth out, or ride above the rock wall surface imperfections, on top of the spherical solids after inserting these desirable lubricant solids into the well bore, into any filter cake of the bore hole wall, and or provide a medium to which the pipe, tubing, liner or casing assembly can ride upon or roll upon above the well bore rock wall, drilling fluid filter cake or upon the rolling solid materials.

Lubrication of the well bore can be complicated due to the surface disconformities of the rock face, rock walls, and the interactions of steel and various types of underground formations of the rock drilled, its structure, layering, formation lithology, formation hardness or softness encountered. Lubricants are generally added in large volumes as the entire volume of the drilling fluid in the circulation system generally requires treatment to gain some measure of reduction. This means that large volumes of lubricants must be used as they are carried by the entire volume of the circulating fluids system. The negative side of using spherical solids or ball bearing type lubrication methods is that the particle sizing required to achieve the desired lubrication effect is often much larger than the size of solids that can be tolerated in a fluid and hence the vast majority of this type of lubrication material is removed, pulled out of fluids, and or separated from fluids with the other undesirable solids (like drilled cuttings) via mechanical solids control removal equipment making the recovery and reuse of lubrication beads a complicated process of separation and removal from the now mechanically separated solids mixture which can be considered heavy, sticky, soft, abrasive, crumbly, and generally contaminated waste solids that need to be removed from the circulating fluid for disposal.

The described invention provides significant cost savings to users who utilize bead recovery systems to recover and re-use these types of lubricants designed to reduce torque and drag forces during drilling, completion, or other operations, with continuous pipe or tubing assemblies.

In one embodiment, a method of recovering low density polymer lubrication beads from a drilling fluid being circulated during drilling operations, or other operations, prior to entry of the actively circulating fluid to the primary mechanical solids control equipment intended to remove the undesirable solids from a circulating fluid system before that fluid is sent back around the flow loop. Current mechanical recovery systems are designed to separate drilling lubrication beads from already processed cuttings that have been separated by the primary solids control measures including vibrating linear motion shakers, or shale shakers at the work site. Drilling lubrication beads are added to a drilling fluid, fluid, at surface in tanks at or near the initial suction point in the active flow loop and circulated down hole as a component of, percentage of, the drilling fluid, fluid, to provide lubrication and reduce torque and drag forces downhole. As a drilling operation progresses new rock formations are cut, exposed, or developed deeper into the ground and the resultant cuttings or undesirable solids, which will be separated and discarded, are brought back to the surface along with the lubrication beads, as part of the active circulation system as a homogenous fluid, or a mixture of desirable and undesirable solids including chemicals added to the fluid, or fluids. Upon return to surface the circulating fluid, sometimes called returns and that is contaminated with the drilled solids, is sent immediately down a flow line to one or more linear motion or vibrating solids (shale) shakers covered with meshed screens of various sizes to allow the shaker screen to remove or separate from the fluid as many drilled solids of a specific size, based on the screening size and larger, and to remove the undesirable solids from the drilling fluid. The screening process also partially dries or remove liquids from the waste stream solids as much as possible to limit disposal costs, volumes, fluid content, and to meet disposal criteria or mandated requirements as the flow of fluid continues through the screens under that shaker and back into the settling tanks, tank, of the active flow loop. This fluid cleaning or processing with sized vibrating meshed screens also removes the vast majority, all or most, of the desirable and potentially reusable drilling lubrication beads and deposits them intermixed with the unwanted drilled solids in a waste disposal pile or container.

Current drilling bead recovery systems require the once separated waste solids and lubrication beads to be moved to a holding tank, moved or washed with a water or fluid flow from below or after the shaker or shakers deck or screen deck to another separate tank and additional processing equipment components. The now separated and dried solids mixture is once again homogenized within another closed loop, or partially closed loop tank, containing the same or close to the same circulating fluid as the active circulating system, and then re-processed by pumping the resultant re-homogenized fluid mixture through a hydrocyclone, or series of hydrocyclones, to generally separate the lubrication beads and solids into two flow streams. A hydrocyclone creates a specific flow dynamic inside the hydrocyclone body that takes advantage of "Stokes Law" for settling solids and can create two separate fluids streams inside based on particle densities and size then produce from the hydrocyclone a top flow, or overflow, (a low density stream of fluid and particles) and a bottom flow, or underflow, (a high density of fluids and solids with more solids reporting to the lower point or discharge of the hydrocyclone), with each resultant flow sent or pumped to one or two separate, secondary, and additional shaker screening pieces of equipment of the current recovery systems. The additional shakers once again, in this secondary process required by most current equipment, separates the higher density fluid mixture of generally drilled solids on one additional screened shaker, for storage and disposal, and the lower density fluid mixture of generally lubrication beads from the hydrocyclone overflow processed fluid on a second additional screened shaker such that the generally dry drilling beads are captured for reused or reintroduction back into the drilling fluid being circulated during the drilling operation or other operations that require the drilling fluid to produce lubrication or fluid benefits. Separated drilling lubrication beads can now be reintroduced into the drilling fluid of the active circulation system without a large percentage of solids contamination or drilled solids present. The hydrocyclone underflow drill solids are once again processed to an, as dry as possible state, to limit disposal volumes and costs. The current bead recovery processes require separate equipment, or additional equipment being brought to the site. Due to the complexity of that equipment skilled human operators are required at all times during their operation to monitor and control the systems and system performance.

Current systems are bulky, require additional site space, additional shale shakers, and a separate tank to re-homogenize the solids and beads mixture of the previously dried solids. This process requires several pumps, multiple hoses, electrical systems, and manpower cumulating into costly and large sized equipment package. There is therefore a need to have a smaller recovery system that requires less maintenance and reduced skilled manpower to operate and recover the desirable low-density polymer lubrication beads. A system that requires limited manpower to set up, run, transport, reduces the onsite footprint, and the overall costs of the currently available recovery options. Other aspects and features of the present invention will become apparent to those ordinarily skilled in the art upon review of the following description of specific embodiments of the invention in conjunction with the accompanying figures.

Drilling, work over, and completions fluids are commonly utilized to provide many functions while drilling wells or servicing wells including lubrication and inhibition to underground formations. Circulating fluids can carry lubricants, inhibitors, loss circulation control products via the drill string, tubing, coiled tubing, casing, or liner strings to various or all points in a well. Most fluids are aqueous based, hydrocarbon based, or emulsions of the above in many phases or percentages. The circulating fluid may be a drilling fluid, well kill fluid, or a frac fluid. A well kill fluid is a fluid with a density great enough to produce a hydrostatic pressure to substantially shut off a hydrocarbon or water flow into a well from an underground formation from a high pressured or abnormally pressurized formation flow of water or hydrocarbons, for example, comprising a regular drilling fluid which had been weighted up (density increased) with barite, hematite or other high density solids or is some cases dissolvable salts to increase the fluid density. It is understood that drilling fluid is used herein as a general term, and can be various wellsite circulating fluids containing lubrication beads.

The present invention is a mechanical process and method of separation for the efficient recovery and reuse of low density polymers lubrication beads being solid or semi-solid generally spherical lubricant bead compounds added to a circulating fluid to provide a ball bearing type lubrication affect or surface pebbling effect, to provide additional lubrication to drill pipe, tubing, coiled tubing, pipe in general, that is in surface contact with a bore hole rock surface, steel surfaces, and or any combination of surfaces where the drill pipe, tubing, coiled tubing, liner, packers, and or any combination that requires lubrication to ease the mechanical forces and frictional forces while rotating, reciprocating, and or moving the drill pipe, tubing, coiled tubing, liners, and or production liners in any given direction required to complete the well site operations. Lubrication beads, friction reducing beads or spheres, such as Sun Drilling Products "Lubraglide Beads® can be described as being generally composed of polymers or copolymers blends of polystyrene and or other polymers or polymer blends. The beads are solid or semi-solid, clear to opaque in color, thermally stable up to 500 F, can withstand tremendous applied pressures, can be utilized in most fluids or fluid combinations, have a specific gravity of about S.G. 1.05-1.06 g/cm3 and are available in several particle sizes from a Coarse sizing of 20/40 US mesh to Fine sizing at 45/100 US mesh and multiples of other sizing potentials. The sizing required may vary due to desired effect, engineering parameters, operator requirements, and or down hole tools, orifice, or other mechanical limitations on acceptable particle sizing.

The present invention, unlike the previously described or currently available processing equipment and methods, does not require the undesirable solids or particulate and desirable lubrication beads to be mechanically separated from the active circulating fluid by shale or solids shakers firstly and then re-homogenized into another fluid to go through the separation process again. The present invention utilizes pump suction to draw the fluid from the active circulation system or the primary circulating fluid as an already homogenized fluid stream (after its circulation down hole and return to surface with all the included chemicals, added products, and newly drilled solids) from the return flow line before it enters the primary mechanical solids control equipment available. The present invention then separates the undesirable solids or particulates and desirable lubrication beads into two separate flow streams and pumps the two separated flow streams, one containing the desirable lubrication beads and one with undesirable solids, back to an isolated point in the original flow loop, or line, just before the flow enters, or is placed onto, the primary solids control equipment to be further processed by the mechanical shale or solids shakers. Of the two or more primary shale shakers generally available at the work site for processing the active circulation system; one can now be isolated and used to recover and screen out the lubrication beads with the dried bead stream being captured from the end of the shaker screen deck and sent, or flowed, directly back to the active circulation system or downhole suction tank, or tanks, through a bead return catch trough via a flush fluid line, or hose, for re-use. The other stream sent, flowed, or pumped, to another available isolated and separate shaker to process and screen out the undesirable solids for disposal and returning the screened fluid to the active circulation system. The mechanical system and process of the invention does not require additional homogenization tanks for solids re-homogenization or additional vibrating shaker systems of the previously described current processes.

The present invention reduces the general size, amount of, and requirements for additional equipment. Additionally, the need for a skilled operator(s) is greatly reduced due to system automation and reduced processing complexity, as a result of isolating the fluid flowline flow, changing the point of processing, and capturing the fluid in an already homogenized form, processing as an extension of the active system or flow loop, which provides substantial cost savings to the user.

The current fluid circulation system at a well site is generally a closed loop generally referred to as the active system where the volume of fluid is circulated down hole through the drill pipe, tubing, coiled tubing, liner or other pipe and rises back to surface in an annular space between the pipe and any developed open hole or any previously steel cased hole sections. The described circulation method can be reversed in fluid direction during some specific operations.

Various materials are added to the fluids to adjust chemical and physical properties with the intention of those materials to become an integral part of the fluid and survive past the solids control efforts (designed to remove waste materials and solids) and then continue through tanks of the system to be recirculated down hole again in a continuous loop. Upon arrival of the fluid back to surface this completely homogenized fluid flow of chemicals, particulate, waste solids, and drilling lubrication beads is generally immediately sent down a flow line to and over, or through, the circulating systems primary solids control measures which generally includes 1-2 or more vibrating screen shakers, then flows through and under the shakers to a series of tanks in the circulating system, or settling tanks, where high gravity centrifuges can draw on the fluids and further remove more undesirable fine particle sized solids that have passed through the sized vibrating shaker screens. These solids control systems are complex and need to meet not only the requirement of the fluids designed chemistry but the user's requirements as well. It is desirable to remove as many drilled solids or waste solids from the fluid on the screening process to assist the centrifuges in the removal of very fine particle sizes of those undesirable solids and or particulates. The shakers screens are generally sized smaller (finer) than the particle sizes required by the lubrication beads to be affective therefore they expel the lubrication beads into the waste solids pile. The first line of defense for a properly maintained circulating or drilling fluid is the shale or solids shaker. The shale or solids shaker, in various forms, has played a prominent role in oilfield solids control schemes for several decades. Shakers have evolved from small relatively simple devices capable of running only the coarsest screens to the models of today. Modern, high-performance shakers of today can use 100 mesh and finer screens at the flow line in most applications. Shaker technology may be defined by the types of motion produced by the machines; (a) elliptical "unbalanced", (b) circular "balanced", or (c) the modern linear "straight-line" design. There are many types, technologies, and configurations of shale or solids removal shakers.

The use of vibrating screens to remove drilled solids from a circulating fluid uses only one characteristic of solids particles; their size. Another factor, which affects separation, is particle density. Solids control devices which take advantage of both particle size and particle density, speeds up the settling process by application of centrifugal force.

These devices utilize "Stokes Law" as the basis for their operation. Stokes Law defines the relationship of factors governing the settling velocity of particles in a liquid. This relationship may be stated in its simplest form as; larger particles (of the same density) settle more rapidly than smaller ones, high density solids settle more quickly than low density ones, and high acceleration and low viscosity speed up the settling rate.

Hydrocyclones (also referred to as cyclones or cones) are simple mechanical devices, without moving parts, designed to speed up the settling process. Feed energy is transformed into centrifugal force inside the cyclone, to accelerate particle settling in accordance with Stokes Law. Centrifugal pumps must be properly sized for cones to operate efficiently. Centrifugal pumps are constant energy (head) devices, and not constant pressure devices. Feed head is constant regardless of mud weight; pressure varies with mud weight. A hydrocyclone, consists of a cylindrical conical shell with a small opening at the bottom for underflow discharge, a larger opening at the top for liquid discharge through an internal "vortex finder", and a feed nozzle on the side of the body near the cylindrical (top) end of the cone. Fluids enters the cyclone using energy created by a centrifugal feed pump and the velocity of the fluid causes the particles to rotate rapidly within the main chamber of the cyclone. Heavy, coarse solids and the liquid film around them tend to spiral outward and downward for discharge through the solid's outlet commonly referred to as the underflow. Light, fine solids and the liquid phase of the mud tend to spiral inward and upward for discharge through the liquid outlet commonly referred to as the overflow. The size of hydrocyclones commonly varies from 4" to 12" (101 mm to 305 mm). This measurement refers to the inside diameter of the largest, cylindrical section of the cyclone. In general, the larger the cone the greater its throughput. In a hydrocyclone, larger particles have a higher probability of reporting to the bottom underflow (apex) opening, while smaller particles are more likely to report to the top (overflow) opening.

In one embodiment, the present invention generally intercepts all volume, a large volume of, a volume of, or controllable percentage of the returning homogenized fluid and or fluid flow with self-priming pumps, pumps, vacuum suction, suction, and or pumping machinery, such as pump 20, from the returns fluids upstream of any solids control equipment such as shaker screens 214, 224, for example directly from the returns flowline 400 fluid flow, at an isolated suction point, prior to the fluids entry into the well site primary solids control measures. That fluid stream, arrows DF, is sent to the processing equipment, hydrocyclone 10, for processing and separation of fluids, solids, and lubrication beads. The fluid volume is sucked and pumped or circulated directly from the flow line to the processing equipment hydrocyclone at a point isolated from the primary solids control or at a point immediately before primary solids control, then pumped directly to the processing unit of the invention, directly into a large volume flow hydrocyclone or a hydrocyclone series rated to accept the full volume flow requirements of the circulating system, and or larger volume flows. The fluid stream is pumped into the hydrocyclone(s) and separated into two flows; a higher density underflow, arrow HD, of higher density solids and fluid reporting to or out the bottom of the hydrocyclone and a fluid overflow, arrow HD, of lower density fluids and materials including a large volume of the low-density drilling lubrication beads reporting to or flowing out the top of the hydrocyclone or series of hydrocyclones.

In addition, or combination, the bottom underflow orifice or apex nozzle, may also be opened, sized, or controlled to allow more or less, increase, limit, or restrict, the fluid and solids flow out the bottom of the hydrocyclone or hydrocyclones or to allow more efficient processing of the solids depending on solid types. The hydrocyclone performance can be changed, altered, or improved for a variety of conditions and fluids by changing pump head pressure, pump volumes, or the diameter of the apex nozzle opening which alters the retention time inside the hydrocyclone and the solids efficiency cut, performance, of the hydrocyclone or hydrocyclones.

Pump 20 of the invention can be any of kind of centrifugal pump with any type of packing or seals; preferably the pumps of the invention are self-priming, mechanically sealed, stainless steel, solids tolerant, sealed, and have sufficient pump head pressure to feed the selected hydrocyclone within or near its designed operating parameters at the required full volume flow rate of the active system. Self-priming pumps are useful because they can start and restart without any or significant intervention.

Although the circulating fluid or drilling fluids density and composition may vary over a large range of requirements from Specific Gravity (S.G.) 1.0-1.6 g/cm3 or greater it is generally accepted that most of the undesirable solids or drilled solid have a S.G. of 2.6 g/cm3 or higher and the lubrication beads have a S.G. of about 1.06 g/cm3.

In one embodiment, in the process of the invention the bottom underflow from the hydrocyclone(s) is captured in a small solids catch tank on apparatus 100 and then moved, pumped or returned to an isolated shaker 210 in the primary solids control equipment line, via hosing 42, to a point downstream of the initial isolated suction point of the homogenized fluid in the flow line, and returned generally above or just after that suction point, and or flowed directly onto the primary shaker screening equipment. This bottom underflow HD is not mixed with the stream of return solids slurry DF even though the HD is returned to a point close to the point of suction to the apparatus 100. Thus, the original primary solids control equipment or shale shakers are isolated from the combined drilling fluid DF and the shaker 210 may be used to process the HD fluid and waste solids without the drilling beads entrained, to ensure the proper solids separation from the fluid and disposal of the undesirable solids or particulates, such as those received in discharge tank 216.

The stream mixture of fluid from the top of the hydrocyclone(s) overflow, arrow LD, continues through the pumping system in a return flow line or hose 44 directed back to a separate, second isolated screened shaker 220, isolated from the main flow back of fluids DF from the well and isolated from the shaker 210 processing the underflow solids. Shaker 220 is in the primary solids control loop and acts to remove or separate the drilling lubrication beads from the overflow fluid. The separated beads are then captured from the end of the shaker, or off the shaker deck or screens, into a bead catch trough 226. The beads are then flushed down a line or hose 5 returning to the active circulating system tanks, settling tanks, or suction tank for re-use. There may be a source of flush fluid 6.

This process allows the fluids 211a, 211b from both processing shaker streams to continue down the original flow loop passing through and under the shakers flowing towards secondary solids control measures and mechanical cleaning equipment.

Alternatively, the mixture flow of fluid from the top of the hydrocyclone may be directed back to the active circulating fluid system, settling tanks or a suction point, without the requirement to go over a shaker if the solids percentage is low enough and the amount of retained fine solids in the fluid is low enough while still containing all or a significant percentage of the lubrication beads. The mechanical system and methods of the present invention reduce the requirement for additional tanks and screened shakers of a secondary process to separate and recover the desirable lubrication beads. The hydrocyclone(s) of the invention could further be adjusted such that the inflow from the flow line of drilling fluid is processed into two streams that are sufficiently cleaned of waste solids removed in a mostly dry form and the lubrication beads recovered with minimal if any undesirable solids present to have the underflow sent directly to a solids disposal bin without having to go over a vibrating shaker to reduce the water content of the solids intended for disposal and produce an overflow of lubrication beads and clean fluids that could be sent directly back to the active drilling fluid suction system without the further requirement of solids control processing with shakers or centrifuges. As well the hydrocyclone(s) of the invention could have a percentage of various sized chains of partially hydrated polyacrylamide polymers PHPA, added to the fluid process stream before the hydrocyclone(s) inlet further enhancing the performance of the hydrocyclone by forming pin flocs, or chemically flocculating solids together, while circulating inside the hydrocyclone(s), further increasing the performance of the hydrocyclone such that the requirement for other solids control processing on the active drilling fluid or fluid is not required. This may further eliminate the need for extra equipment and costs.

The present invention pump draws through suction force or pump suction the actively circulated homogenized fluid stream directly from the returns flow at the point where the fluid returns to surface and possibly where it enters a tank, such as tank 212 on a shaker, but prior to or before solids control equipment. Tank 212 is sometimes referred to as a shaker box, shale tank, shale box, or the possum belly of a shaker or shakers.

The suction hoses and pumping lines of the invention can be of various internal sizes depending on the hydrocyclone(s) size and volume requirements, flow rate, the expected flow rate, type of fluid or physical properties of the fluid, to prevent fluid cavitation, or other suction line problems, and or the actual pump rate of the circulation fluid and the requirements of the operator. In one embodiment, a suction pipe turn, tube, hose, or hose attachment, is placed in the shaker box tank or the fluid tank (possum belly) of an isolated receiving shaker (first shaker 210) where the main centrifugal pump of the invention can intercept the full flowline volume of the circulation fluid prior to the fluid running over and through the shaker screens. The apparatus 100 may have several safety mechanical mechanisms and programs installed in the control interface to ensure the overall safe operation of the invention and to reduce the potential of any fluid or slurry spills. The main suction U-turn pipe placed in the shaker box or the isolated main suction point includes a solenoid 46 in the main suction U-turn assembly pipe to prevent the siphoning of fluids by the main pump 20 of the invention when required. The pumps of the invention, being generally placed lower than the point of the main suction of the active fluid, or fluids, are in a position in which syphoning of the fluids is potential when the active system pump is idled or shut down due to an emergency condition or fault detected by the interface control system. In the event of certain conditions like pump failures, or a solids catch tank overflow being detected by a mechanical electrical overflow emergency switch inside and near the top of the solids return tank 213 under the hydrocyclone 10, the interface will go through a series of programs designed to clean or clear the pumps and tanks. However in the event of a required shut down, the solenoid safety in the main suction U-turn pipe will open (the solenoid default position is open without power in the event of a power failure to prevent siphoning) and allow airflow into the suction line breaking the siphoning action back to the pumps and tanks of the invention. During normal operation of the invention the main suction fluid from the flow line before shakers and solids control is circulated into the pumping system of the invention via internal piping to a hydrocyclone or hydrocyclones set in parallel line capable of handling the planned, expected, or desired fluid flow rate of the active circulating system with some extra handling capacity if required.

In one embodiment, the hydrocyclone is an Elgin 10" Desander however a variety of hydrocyclones from various manufacturers could be utilized on the invention and is not intended to limit the scope of the invention. The present invention may pump the full volume of the homogenized fluid into the feed inlet or inlets of the hydrocyclone or hydrocyclones. The pumps of the invention may be Flomax MP30 Stainless Steel (500 gpm) powdered with a 30 HP electric motor for main suction and hydrocyclone(s) feed and a Flomax MP8 Stainless Steel (150 gpm) powered by a 5 HP electric motor for solids slurry return; however a variety of pumps, pumps types, and power sources could be utilized and is not intended to limit the scope of the invention. The captured flow is processed inside the hydrocyclone(s) and separated into two flows; the low density stream, or overflow (lighter fluids and particulate including the majority of lubrication beads) and the high density stream, or underflow (heavier particulates and solids with some fluid). The overflow continues from the hydrocyclone(s) through a return line back to the shaker box of another or separate isolated shaker 220, placed with a discharge spout directly into the shaker box or above or onto the screens directly of the isolated screened shaker (shaker #2 220) where the fluid is processed with vibrating screens and the desirable lubrication beads are separated from the fluid and move down to the end of the shaker screens to be captured with the remaining fluid continuing through the screens through and under the shaker into the original flow loop to secondary solids control measures and fluid cleaning processes. The separated beads on shaker #2 fall off the end of the shaker into a catch bin 226 placed at the end or bottom of the shaker screen deck and flushed with clean circulating fluid back into the primary suction tank or settling tanks of the active circulating system to be re-used or re-mixed and sent back down hole as a recovered lubricant. The underflow is discharged into a partially closed solids catch tank under the hydrocyclone(s) where a second pump 30 of the invention draws the underflow fluid, particulate, and solids slurry mixture and pumps it via lines and hoses 42 back to the isolated shaker #1 and discharges the mixture via a spout just above or back directly onto the shaker screens of shaker #1, not back into the isolated suction tank or shaker box of shaker #1 where the initial suction point is located, but ahead of that point directly onto the shaker screens of shaker #1 where the remaining solids are separated from the fluid. The fluid then passes through the shakers screens and continues through the active flow loop and to secondary solids removal processes. The remaining screened out solids fall off screen deck of shaker #1 and are deposited in a waste tank for further treatment and or disposal.

In one embodiment, the present invention has an electrical system and controls rated Classification #1 Division #2 or ideally designed for usage in or near an explosion proof environments for safety considerations or operator requirements however can be wired to be fully explosion proof, semi-explosion proof, or in a non-explosion proof configuration. In one embodiment, the present invention is designed to require minimal skilled labor or manpower to generally operate once the invention has been set up or configured on-site. The centrifugal pump drive motors of the invention are wired for variable speed control (VFD) and for ON/OFF operation and for rotational speed from a computer-controlled interface control panel on the invention or manually via a wired or wireless remote control. The variable speed control and electronic interface allow for a wide range of flow rate operations based on the requirements of the hydrocyclone(s) and overall recovery parameters of the operator ranging from some percentage of recovery, to a much as possible recovery of the lubrication beads. The present invention may have one or more ultrasonic liquid level transmitter probes, such as the EchoTouch® LU20 or LU30, placed in locations to control the ON/OFF action and rotational speed of the pumps for general operation of the invention or to detect the event of a fault in operation of the invention. Several ultrasonic probes are available and could be utilized on the invention and is not intended to limit the scope of the invention. The invention may include an EchoTouch® Probe that is placed onto and positioned above the mud tank (possum belly) of the suction point shaker #1 for volume control at that point by the invention. The EchoTouch® Ultrasonic Probes of the invention are ideally explosion proof, or intrinsically safe, however are not required to be explosion proof for the invention. The EchoTouch® Ultrasonic Probes can be set and adjusted to a wide variety of tank shapes and sizes to have a High Tank Level Setting and a Low Tank Level, with an operation range in between settings, based in either Inches or Centimeters below the ultrasonic signal transducer. The EchoTouch® probes send an ultrasonic sound wave pulse 2 times a second from the base of the transducer to the surface of the processes medium, drilling fluid, or fluid and that sound wave reflects against the process medium, drilling fluid or fluids, and returns to the transducer. The microprocessor-based electronics measure the time of flight between the sound generation and receipt of the signal, and then translates this figure into the distance between the transmitter and process medium below; drilling fluid, or fluid. The EchoTouch® probe measures the volume within the isolated shaker suction point and sends this information to the control interface panel of the invention. The invention control interface panel (HMI Panel) is set by the operator and programmed to automatically adjust the main suction pump of the invention to maintain the actual volume fluid level in the shaker box suction at an adjustable and controlled level point based on the operators commands such that the full flow of volume from the flowline can be intercepted and sent to the systems of the invention. The interface of the invention has preprogrammed control over the variable frequency drive (VFD) units that control the rotation and suction or flow of the pumps to maintain the desired operator input fluid levels. The interface will automatically increase or decrease the drive motor rotation and pump output volumes so as to maintain the volume in the suction shaker box, as set by an operator, such that the interface can automatically adjust to high or low flow volumes coming from the flow line under any flow conditions or issues with flow from the source of flow into the flow line at the inventions suction point. The source of flow is generally the positive pressure flow pumps of the active system and active flow loop. The EchoTouch® Ultrasonic Probes allow the interface of the system to have complete control over the pumps of the invention and the volumes required to be processed. This automatic control of the pumps by the Control Interface as measured by the EchoTouch® Ultrasonic Probes allows a proper volume of fluid to remain in the shaker box or mud tank (possum belly) at all times and to maintain the pump and line suctions of the invention in a charged (suction picked up or ready position) during active fluid circulation shut downs by the positive pressure flow pumps of the active system and active flow loop, or when the pumps of the active fluid circulation system are turned off for connections of pipe or other events. Another EchoTouch® Ultrasonic Probe may be placed in the solids catch basin 213 under the hydrocyclone(s) where pump 30 of the invention draws the underflow fluid, particulate, and solids mixture and pumps the slurry via lines and hoses back to another isolated shaker or shaker #2 for processing. The EchoTouch® Ultrasonic Probe can be set to have a High Tank Level Setting and a Low Tank Level setting may be based in either Inches or Centimeters below the transducer. The EchoTouch® probe measures the fluid volume within the hydrocyclone underflow tank, or solids tank, and sends this information to the control interface panel of the invention. The invention control interface panel, HMI Panel, is set by the operator and programmed to automatically adjust the rotation and volume of the second pump #2 suction pump of the invention to maintain the actual volume fluid level in the solids tank suction at an adjustable and controlled level point based on the operators commands. The interface of the invention has preprogrammed control over the variable frequency drive (VFD) units that control the rotation and suction or flow of both pumps, specifically pump 30 in this case, to maintain the desired operator input level. The interface will automatically increase or decrease the drive motor rotation and subsequent pump output volumes so as to maintain the volume in the solids tank, as set or pre-programmed by the operator of the invention, such that the interface can automatically adjust to high or low flow volumes coming from the flow under the hydrocyclone, given a variety of flow conditions or issues, and pump those returns back to the specified shaker to processes the solids from the fluid for disposal. The EchoTouch® Ultrasonic Probes allow the interface of the system to have complete control over the pumps and the volumes required for the invention to process automatically.

The HMI Interface Panel of the invention is a touch panel which contains and displays the operational status and control elements for all the system components. It serves as a way for the operator to tweak or adjust the automatic operation of the system and view component status, sensor readings, and diagnostic information. This information system can broadcast a signal via cellphone or wired connection to both the main information display system of operators site, such as Pason®, RigWatch®, NOVOS®, or other similar digital display systems, and or to the cellphone or an internet site for viewing by the operator of the invention.

The reduced size and footprint of the invention and the automatic volume controls and interface systems are beneficial to the operator to limit the required manpower, improve efficiency, and reduce costs. If one or both pumps of the invention are set to an OFF or tripped to an OFF condition by the interface control, using preprogrammed conditions and events, the pumps will automatically stop to prevent any overfilling or flow over from the invention onto the ground at both the main suction point shaker tank or mud tank (possum belly) and the underflow solids catch tank. If the pumps of the invention are set into an OFF position or tripped to a fault condition by safety switches, reaching set points on the EchoTouch® probe levels as set by operator, or by the programmed interface, then the flow from the actively circulated fluid at the main suction point is bypassed, and disrupted by the anti-siphon valve, by the invention and will continue down, or defaults back to the original panned, or regular path of the flow line flow over the primary shakers and into the active system tanks; reducing the chances of an overflow or spill condition during the operation of the inventions pump(s).

The present invention also can adjust the flow parameters, solids retention time, and pressures inside the hydrocyclone(s) body with replaceable underflow nozzles, referred to as Apex Nozzles restrictions, or through a manual valve placed into the overflow return line and or combination of either.

The present invention has several advantages over current drilling bead recovery systems. The present invention includes programmable EchoTouch® Ultrasonic measurements of volumes, the interface control can report its status in real time to the operators chosen Electronic Rig Information system such as Pason® or similar systems like NOV (National Oilwell Varco) Rig Sense® for viewing at all levels of the operators command and control network, can report is operational status or default conditions to its service operator via a cellular phone link or internet connection, is smaller, lighter, requires less piping and additional connections to set up than current equipment, requires less man power or extra skilled labor, reduces the onsite foot print required, allows more placement options on site, lowers transportation and handling costs with a smaller design and lower overall weight of the invention, requires less electrical power, operates in real time as an extension of the active circulation system, operates as a component of the active system flow loop, requires no extra handling of solids or the re-homogenization of particulates, does not require extra fluid to be created for usage or processing by the invention, has programmable automation, automated controls and safety systems, included mechanical safety systems and spill prevention, decreases the potential for the build up of microfine solids or pulverized solids in the active system drilling fluid or fluids from additional processing similar to the re-homogenization and re-mixing in the processing fluid used by the current processing equipment. Current systems generally require volumes of the circulating fluid to be held in their tanks to be used to re-homogenize the solids and particulates including lubrication beads, further degrading the particle size of solids or drilled solids during the mixing processes, until such time as the processing fluid contained in that system is contaminated with fine solids and must be dumped back into the actively circulating fluid, disposed of, and or be replaced with cleaner volumes from the active system. This process can move additional micro fines and drill solids into the active system which can be detrimental to the original fluids chemistry and increase the cost and consumption of solids control chemicals like PHPA's or Partially Hydrated Polyacrylamides or other chemicals in general. The present invention allows for some of the initial flow at the main isolated suction point to be controlled and bypassed over the shaker screen effectively removing a controlled percentage of beads in the system over a circulation of the loop. As beads become worn out it is sometimes desirable to screen some out of service. Current systems are unable to selectively screen out or control screen out a known percentage of beads in system. The present invention requires no re-homogenization process and minimizes the potential for any further solids size degradation or for re-mixing conditions that may further mechanically damage the lubricant beads.

The present invention also includes a variable level suction point and automated flush dilution system in the solids catch tank that can be used for additional bead polishing or recovery from underflow of hydrocyclone. Some of the desirable beads can report to the bottom of the hydrocyclone(s) and would be disposed of via the solids return system if the active fluid density is below the specific gravity of the beads or if the flow of fluids in the hydrocyclone underflow must be increased to assist the removal of solids or extra solids in the fluid flow. A flush stream of water is added to the solids, in the solids catch tank, and a centrifugal agitator slowly mixes and dilutes the solids so they may be sent to a hydrocyclone(s) for secondary bead recovery or polishing of the solids slurry. The solids slurry water percentage can be controlled by the operator though a solenoid flush valve which is controlled by interface and EchoTouch® Ultrasonic Probes. This flush valve addition of drilling fluid, fluid, can additionally be utilized to decreases the percentage of solids to fluid being pumped back to the rig shaker for disposal as a benefit for the solids return pump if the solids slurry it too dry for return pumping operations. This flush system and action allows some of the beads that did pass through the hydrocyclone(s) with the solids; to become more buoyant in the slowly mixing slurry; the slurry can in part then be sucked off or removed, for example from tank 213, and sent back through a line 215 into the main hydrocyclone(s) 10 for another chance to be separated out the top overflow with the low density fluids and materials; or may be pumped from the solids slurry tank 213 to another separate, possibly smaller, hydrocyclone(s) in the system to further polish the flush fluid solids slurry and beads mixture to further remove the beads for recovery and re-use.

Recovery of beads in a lower than bead density fluid, fluids with less density that 1050 kg/m3, is improved by the secondary polishing system as described above. The tank setup of the invention allows for additional processing of beads received into the underflow solids tank below the hydrocyclone(s) for circulating fluids with less than the density of the lubrication beads to further recover more lubrication beads from the underflow fluids. The invention described herein predominantly process and recover beads from fluids that are higher in density than the beads recovered; >1.06 g/cm3 on average. If the fluid being processed is below the density of the beads <1.06 g/cm3 then a increased percentage of the beads may report to the bottom of the hydrocyclone and be ejected with the undesirable or waste solids as a higher density solid in the fluid, however not all the lubrication beads as the higher percentage will report to the overflow as a component of the fluid.

A secondary process can be added to the system to separate and re-run those beads back through the main hydrocyclone(s) 10 or another separate hydrocyclone. As solids, fluids, and uncaptured beads enter the solids catch tank under the hydrocyclone they are mixed with a dilution fluid, comprised of the clean or cleaned original drilling fluid, and diluted while being centrifugally agitated such that the lubrication beads are suspended in the generally free or lighter fluid in the top portion of the solids catch tank. The tank has centrifugal agitation which allows the beads to be separated further from the high percentage solids mixture ejected from the hydrocyclone separating the fluid into a lighter density zone at the top of the solids tank and a heavier zone with mostly high density solids at the bottom of the tank. The addition of clean or cleaned drilling fluid to reduce the viscosity and density of the solids slurry bead mixture allow the beads to be released and be suspended higher in the water column inside the solids catch tank. A secondary suction line is attached to the solids tank, and is height adjustable within the solids tank to a desired suction point level near the top or upper fluid layers containing more free lubrication beads, this secondary suction line attachment can be opened to draw the lower density fluid bead mixture into the main suction line of the invention and sent back into the main hydrocyclone for secondary processing within the main processing stream or can be drawn from the solids tank and pumped back to another separate smaller hydrocyclone for secondary polishing and processing. The main hydrocyclone of the invention is designed such that it can process the entire flow of the main circulation system with 10% excess and process the additional fluid from the secondary processing system if desired or required.

An example of the above:
(a) Active System Process Total Volume—350 gpm
(b) 10% Extra Process Volume—35 gpm
(c) Secondary Process Volume—50 gpm
(d) 10% Extra Process Volume—5 gpm Using the above volumes, the hydrocyclone should be selected to be able to handle 440 gpm or more depending on drilling fluid circulation requirements. These calculations are for example only and not intended to limit the scope of the invention.

CLAUSES

Clause 1. An apparatus for facilitating recovery of lubrication beads from a drilling fluid by a solids control apparatus, the solids control apparatus including a first shaker and a cleaned fluid handling system; the apparatus comprising: a hydrocyclone, with an upper end and a lower end, for separating drilling fluid into a high density stream and a low density stream containing a major portion of the lubrication beads; a receiving pump, for pumping drilling fluid to the hydrocyclone via a first hose; a discharge pump, for pumping the high density stream from the lower end of the hydrocyclone to the first shaker via a second hose; and a third hose, for flowing the low density stream from the upper end of the hydrocyclone to the cleaned fluid handling system.

Clause 2. The apparatus of any one or more of clauses 1-14, further comprising a solenoid valve connected to the first hose.

Clause 3. A method for integrating an apparatus for facilitating recovery of lubrication beads from a drilling fluid into a solids control apparatus including a first shaker and a cleaned fluid handling system; the apparatus including a hydrocyclone, with an upper end and a lower end, for separating drilling fluid into a high density stream and a low density stream containing a major portion of the lubrication beads; a receiving pump, for pumping drilling fluid to the hydrocyclone via a first hose; and a discharge pump, for pumping the high density stream from the lower end of the hydrocyclone to the first shaker via a second hose; and a third hose for flowing the low density stream from the upper end of the hydrocyclone to the cleaned fluid handling system; the method comprising: positioning an end of the first hose to receive the drilling fluid; arranging an end of the second hose in communication with the first shaker's filter screen; and setting an end of the third hose to empty into the cleaned fluid handling system.

Clause 4. A method for facilitating recovery of lubrication beads from a drilling fluid by a shaker system, the method comprising first, receiving drilling fluid in a hydrocyclone; second, separating, by the hydrocyclone, the drilling fluid into a high density stream and a low density stream containing a major portion of the lubrication beads; and third, flowing the high density stream to a first shaker of the shaker system, and directing the low density stream to a second shaker of the shaker system.

Clause 5. The method of any one or more of clauses 1-14, further comprising selecting a first mesh screen for the first shaker and a second mesh screen for the second shaker, the second mesh screen having a mesh density greater than that of the first mesh screen.

Clause 6. An automated mechanical recovery system and method to separate and recover friction reducing lubrication beads, spheres, or particulate from an existing homogenized circulating fluid or an actively circulating homogenized fluid with a processing method starting at an isolated point prior to the circulating fluid, or fluids, being conditioned by mechanical solids control equipment intended to remove waste solids from the fluids; then returning the recovered lubrication beads back to the active circulation fluid flow loop at a point before the circulating fluid, that has now been conditioned by solids control equipment is pumped back down a hole or well bore and is now ready to have the captured lubrication beads re-introduced to the fluid, for reuse, to provide lubrication in the down hole or well environment pumping circulation loop.

Clause 7. An automated mechanical recovery system and method to separate and recover low density lubrication beads, spheres, or particulate for reintroduction, reuse, or return into a circulating fluid, in the original active system closed flow loop as an extension of the loop, at a point in the flow loop where the homogenized fluid returns to surface but before the circulating fluid has been conditioned with mechanical solids control equipment to remove undesirable solids comprised of drilled solids or other solids.

Clause 8. An automated mechanical recovery system and method to separate and recover friction reducing lubrication beads, spheres, or particulate from an existing homogenized circulating fluid or an actively circulating homogenized fluid with a processing method starting at an isolated point prior to the circulating fluid, or fluids, being conditioned by mechanical solids control equipment intended to remove waste solids from the fluids; then returning the solids slurry back to the active circulation fluid flow loop at a point just after the isolated main suction point, such that solids slurry can be conditioned and separated by shakers or by solids control equipment, for disposal, and the cleaned fluid can return into the circulation loop.

Clause 9. A method of separating and recovering friction reducing lubricating beads from a an already homogenized actively circulating down hole fluid or well fluid for reuse in the same fluid.

Clause 10. A method of separating and recovering friction reducing lubricating beads from a homogenized circulating fluid or drilling fluid at an isolated point where the fluid is returned to surface before entering the solids control equipment of the circulation loop.

Clause 11. A method of recovering friction reducing lubricating beads from a homogenized actively circulating fluid or drilling fluid being returned to surface at a flowline, before any solids control equipment processing point in the flow loop, then re-introducing the recovered beads to the circulating fluid, for reuse, after solids control equipment and prior to the circulating fluid being pumped back down a hole or well bore to provide lubrication in the homogenized fluid, or fluids, being pumped down hole or well bore in the flow loop.

Clause 12. A mechanical lubrication bead recovery system that is controlled with ultrasonic fluid level measuring and computer programmed interface; where the pumps of the system are regulated on/off, or by variable speeds by the interface based on the readings provided from the ultrasonic fluid level indicators of the recovery system at the point of their installation; defined as the initial isolated suction point of the recovery system where an actively circulated fluid is returned and intercepted by the invention as an extension of the active circulation loop at surface prior to solids control measures.

Clause 13. A mechanical lubrication bead recovery system that is controlled with automatic ultrasonic level probes; at the point of the recovery systems hydrocyclone underflow catch bin; where the fluid having been processed to separate a plurality of the lubrication beads through a hydrocyclone process which discharges an underflow of primarily solids, with some fluid, is captured in a solids catch bin on the recovery system and pumped back to a point in the flow loop at, just after the isolated suction point, and at the start point of primary solids control equipment for processing, a point being located just after the isolated point where the bead recovery systems initial point of suction occurs.

Clause 14. A mechanical pumping and recovery system that is controlled with automated ultrasonic fluid level probes and a programmed control interface to control and regulate the bead recovery systems on/off operations, in timing with the on/off pumping operations of the actively circulated original fluid flow loop pressure pumping operations and the required pumping equipment.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

The invention claimed is:

1. An apparatus for facilitating recovery of lubrication beads from an actively circulating drilling fluid by a solids control apparatus, the solids control apparatus including
a first shaker and a fine solids control apparatus;
the apparatus comprising:
a hydrocyclone, with an upper end and a lower end, for separating actively circulating drilling fluid into a high density stream and a low density stream containing a major portion of the lubrication beads;
a receiving pump, for pumping actively circulating drilling fluid to the hydrocyclone via a first hose coupled at an intake end to an intake tank of the first shaker and coupled at a output end to the receiving pump;
a discharge pump, for pumping the high density stream from the lower end of the hydrocyclone to the first shaker via a second hose coupled at a first end to the discharge pump and coupled at a second end to a screen of the first shaker;
the receiving pump and the discharge pump being self-priming; and
a third hose, for flowing the low density stream from the upper end of the hydrocyclone to the fine solids control apparatus.

2. The apparatus of claim 1, further comprising a solenoid valve connected to the first hose.

3. A method for integrating an apparatus for facilitating recovery of lubrication beads from an actively circulating drilling fluid into a solids control apparatus including a first shaker and a fine solids control apparatus;

the apparatus including
a hydrocyclone, with an upper end and a lower end, for separating actively circulating drilling fluid into a high density stream and a low density stream containing a major portion of the lubrication beads;
a receiving pump, for pumping actively circulating drilling fluid to the hydrocyclone via a first hose coupled at an intake end to an intake tank of the first shaker and coupled at a output end to the receiving pump; and
a discharge pump, for pumping the high density stream from the lower end of the hydrocyclone to the first shaker via a second hose coupled at a first end to the discharge pump and coupled at a second end to a screen of the first shaker;
the receiving pump and the discharge pump each being self-priming; and
a third hose for flowing the low density stream from the upper end of the hydrocyclone to the fine solids control apparatus;
the method comprising:
positioning an end of the first hose to receive the actively circulating drilling fluid;
arranging an end of the second hose in communication with the first shaker's filter screen; and
setting an end of the third hose to empty into the fine solids control apparatus.

4. A method for facilitating recovery of lubrication beads from an actively circulating drilling fluid by a shaker system, the method comprising
first, receiving, with a self-priming receiving pump, actively circulating drilling fluid in a hydrocyclone directly from an intake tank of a first shaker of the shaker system;
second, separating, by the hydrocyclone, the actively circulating drilling fluid into a high density stream and a low density stream containing a major portion of the lubrication beads; and
third, flowing, with a self-priming discharge pump, the high density stream directly to a first mesh screen of the first shaker, and directing the low density stream to a second shaker of the shaker system.

5. The method of claim 4, further comprising selecting the first mesh screen for the first shaker and a second mesh screen for the second shaker, the second mesh screen having a mesh density greater than that of the first mesh screen.

6. The apparatus of claim 1, wherein
an ultrasonic probe is configured to detect a volume of fluid in the intake tank; and
one or both of the receiving pump and the discharge pump are configured to regulate flow rate based on the volume of fluid.

7. The method of claim 4, further comprising
measuring a volume of drilling fluid in the intake tank;
selecting a flow rate according to the volume of drilling fluid; and
wherein one or both of flowing and directing includes according to the flow rate.

* * * * *